Oct. 12, 1943.  E. A. KEELER  2,331,698
MEASURING AND CONTROL APPARATUS
Filed May 13, 1939  2 Sheets-Sheet 1

INVENTOR
EARL A. KEELER
BY
ATTORNEY

Oct. 12, 1943.  E. A. KEELER  2,331,698
MEASURING AND CONTROL APPARATUS
Filed May 13, 1939  2 Sheets-Sheet 2
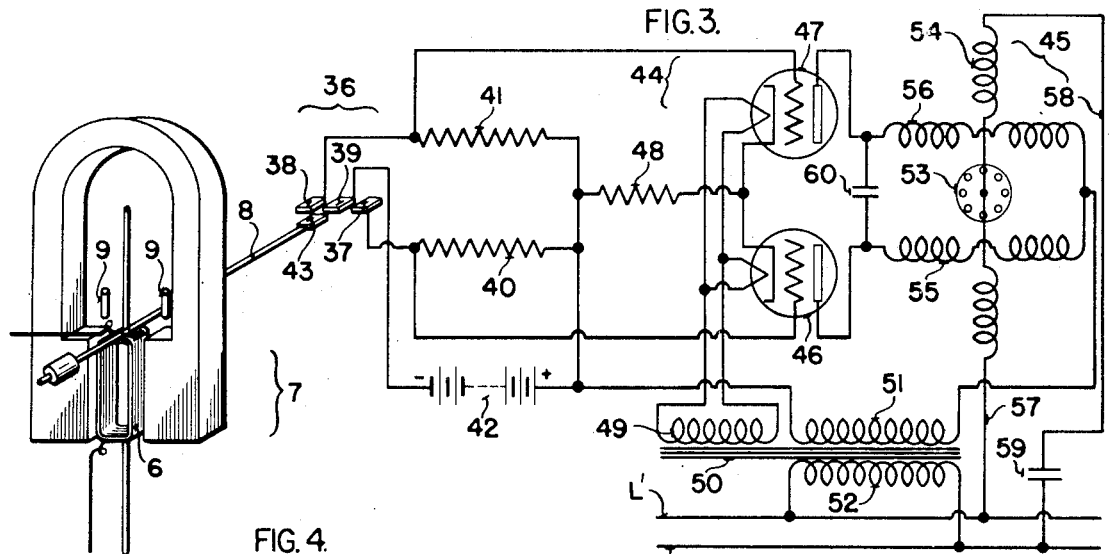
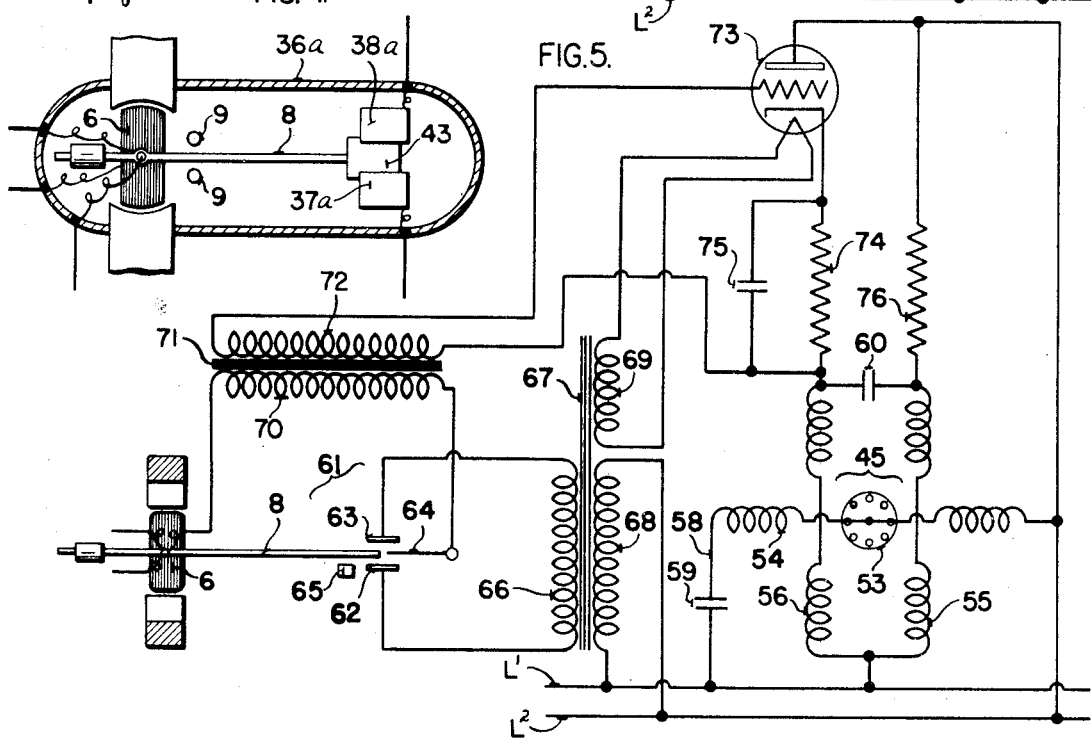
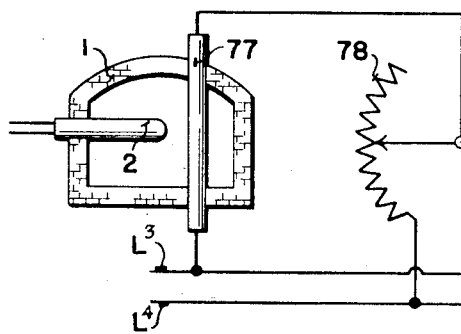
INVENTOR
EARL A. KEELER
BY George M. Muschamp
ATTORNEY Patented Oct. 12, 1943

2,331,698

UNITED STATES PATENT OFFICE 2,331,698

MEASURING AND CONTROL APPARATUS

Earl A. Keeler, Norristown, Pa., assignor to The Brown Instrument Company, Philadelphia, Pa., a corporation of Pennsylvania Application May 13, 1939, Serial No. 273,428

15 Claims. (Cl. 171—95)

The present invention relates to instrumentalities useful in measuring and/or controlling a variable condition, and more particularly to instrumentalities adapted to produce effects in accordance with the deflections of an element which deflects in accordance with variations in a control quantity or in a quantity to be measured, and in which because of the small magnitude of the element deflecting force it is not desirable, nor practicable to have the said effects produced directly by the deflecting element.

An object of the invention is to provide a precision measuring instrument in which an element to be adjusted such as a recording pen, indicating pointer, or other exhibiting part of the instrument is regulated by a reversible electrical motor under control of a sensitive element deflecting in accordance with changes in the value of a quantity to be measured.

Another object of the invention is to provide an instrument adapted to produce recording and/or controlling effects in accordance with the deflections of a sensitive measuring device deflecting in accordance with changes in the value of a quantity under measurement and wherein the means for producing such effects are controlled by a control circuit of which a member carried by the sensitive measuring device comprises an element.

A further object of the invention is to provide improved means for transforming the deflections of a galvanometer coil, or other sensitive deflecting instrument into substantial and corresponding variations of alternating or direct current, which variations may be employed to produce recording and/or controlling effects in accordance with said deflections.

A specific object of the invention is to provide an instrument for the measurement of small electric currents including ionic discharge means maintained at atmospheric pressure and controlled by a sensitive current responsive device to which the electric current to be measured is applied.

In accordance with the present invention, an electrical control circuit and suitable means controlled thereby are provided for continuously regulating the adjustment of an indicating pointer, recording pen, control valve, rheostat or the like in response to unbalance of a normally balanced electrical network as indicated by a sensitive measuring device. The electrical control circuit referred to includes an ionic discharge device having a pair of anodes and a cathode which are maintained at a suitable pressure and provide a divided path for the flow of electric current in said control circuit. The atmosphere in which the said anodes and cathode are positioned is subjected to the ionizing influence of high temperature or of a radio-active substance, such as radium or a suitable compound thereof. In one embodiment of the invention, a radio-active substance is adapted to be moved relatively to said anodes and cathode in accordance with the deflections of an element of the sensitive measuring device to thereby vary the electrical conductivity of the path from one of said anodes to said cathode with respect to the electrical conductivity of the path from the other of said anodes to said cathode. The means referred to above as controlled by the control device includes a reversible electrical motor having forward and reverse windings which are adapted to be selectively energized when the magnitude of the electric current flow from one of said anodes to said cathode exceeds that from the other of said anodes to said cathode. Thus, when the deflecting element of the sensitive measuring device is in a normal predetermined position, substantially equal current values will flow in both anode circuits and the motor will be actuated for rotation with equal force in both directions and will remain stationary. When the said deflecting element is moved away from its normal position the flow of current in one anode circuit will increase and the flow of current in the other anode circuit will decrease, with the result that one winding of the motor will be energized to a greater extent than the other, and accordingly, the motor will be actuated for rotation in a corresponding direction. Movement of the said deflecting element in the opposite direction will produce energization of the motor for rotation in the opposite direction.

In a preferred embodiment of the invention, the moving coil of a galvanometer is connected to the terminals of a normally balanced electrical network, for example a null point potentiometric network which is adapted to measure the voltage developed by a thermocouple, and the motor rotation is employed to rebalance the potentiometric network on unbalance thereof. The rebalancing contact of the potentiometric network is associated with suitable indicating and/or recording means whereby a record of the variations in the thermocouple voltage may be had.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Figs. 2-5 illustrate modifications of the arrangement of Fig. 1; and

Fig. 6 illustrates a use of the invention in a control system.

Figure 1:
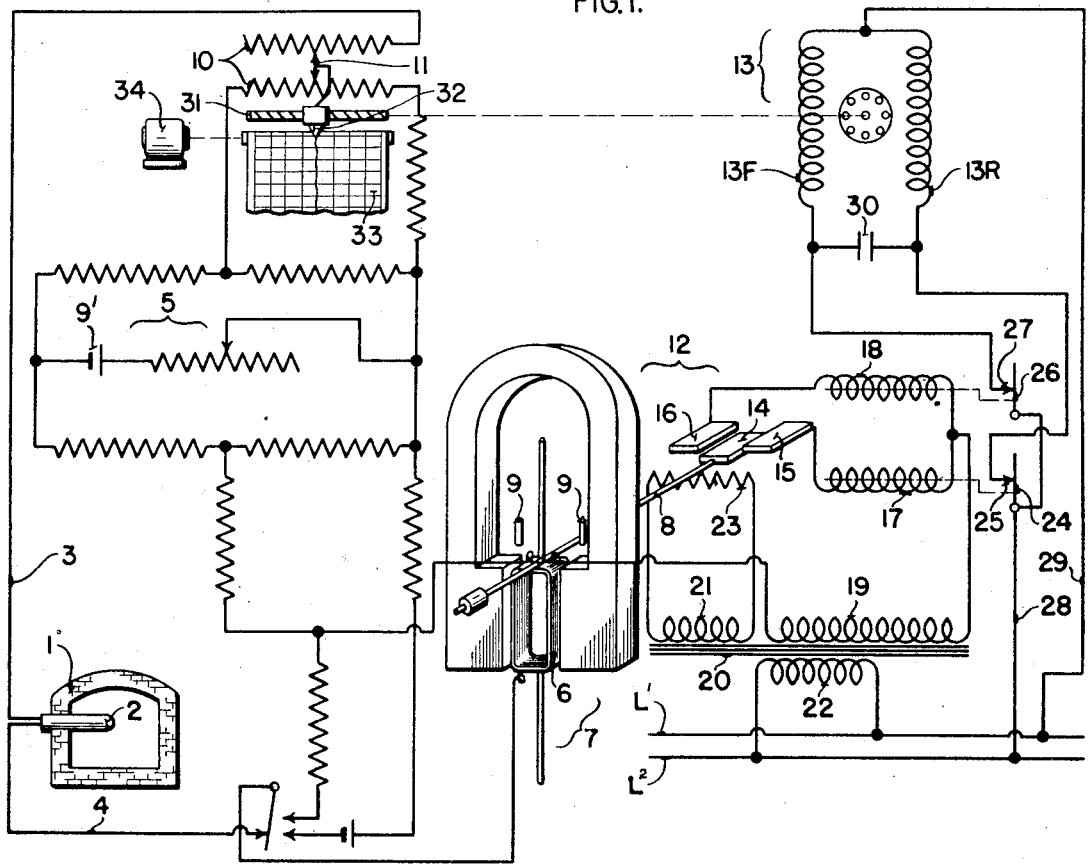
Fig. 1 is a diagrammatic view illustrating one embodiment of the invention as adapted for use in measuring and recording the temperature in a furnace.

In Fig. 1 of the drawings, I have illustrated more or less diagrammatically a pyrometer for measuring and recording the temperature of the interior of a furnace 1. As illustrated, a thermocouple 2 is arranged in the interior of the furnace and the terminals of the thermocouple are connected by conductors 3 and 4 to the terminals of a null point potentiometric network 5 which may be of any suitable type, such as the Brown potentiometric network disclosed in Patent 1,898,124 issued February 21, 1933 to Thomas R. Harrison. The moving coil 6 of a galvanometer 7, which is equipped with an electrically conductive pointer 8, is connected in the conductor 4, and fixed stops 9 are provided for limiting the deflections of the pointer 8.

The potentiometric network 5 is of a well known type, and it is sufficient for the present purposes to note that the potentiometric circuit includes a circuit branch including the thermocouple 2, an opposing circuit branch including a source of known potential such as a battery $9^1$ and resistors 10, a variable portion of which may be connected into the opposed branches by means of a sliding contact 11, whereby the respective effects of the variable and known sources are made equal and opposite, and the galvanometer moving coil is thus rendered undeflected when the circuit is balanced for a given value of the E. M. F. of the thermocouple 2 with the contact 11 in a corresponding position along resistors 10. The position of the contact 11 is then a measure of the value of the thermocouple E. M. F., and as will be clear, will serve as a measure of the temperature to which the thermocouple is exposed.

In the embodiment illustrated in Fig. 1, my invention is specifically concerned with the means by which the contact 11 is adjusted back and forth along resistors 10 in response to deflections of the galvanometer pointer 8 from a predetermined, normal position, and as shown, includes an ionic discharge device 12 and a reversible electrical motor 13, the rotation and direction of rotation of which is adapted to be selectively controlled by the ionic discharge device 12. Motor 13 is connected in any convenient manner to the contact 11 for adjusting the latter along resistors 10, and thereby effects rebalance of the potentiometric network 5 in response to a change in the E. M. F. of the thermocouple 2.

The manner in which deflection of the galvanometer pointer 8 from its normal undeflected position operates to control the rotation and direction of rotation of motor 13, and thereby adjustment of contact 11 along resistors 10 in response to potentiometer unbalance will now be described.

As illustrated, a metallic vane 14 carried on the end of the galvanometer pointer 8 is arranged in cooperative relation with a pair of spaced metallic plates or anodes 15 and 16 and the latter are each connected to a terminal of an associated relay winding 17 and 18. The remaining terminals of the relay winding are connected together and to one terminal of a source of alternating current indicated as the secondary winding 19 of a transformer 20. The remaining terminal of the transformer secondary winding 19 is connected through the electrically conductive galvanometer pointer 8 to the metallic vane 14. The transformer 20 also includes a secondary winding 21 and a line voltage primary winding 22, having its terminals connected to alternating current supply conductors $L^1$ and $L^2$. The terminals of the transformer secondary winding 21 are connected to a suitable heating resistance 23, which is positioned closely adjacent the cathode 14 and the anodes 15 and 16, and is adapted to heat the atmosphere surrounding the said anodes and cathode to the extent necessary to produce ionization of said atmosphere. The voltage produced across the terminals of the transformer secondary winding 19 may desirably be high, for example, of the order of 500 volts or more so that on ionization of the device 12, an electric current capable of operating the relay windings 17 and 18 will flow from the anodes 15 and 16 to the cathode 14. The electric currents in each branch of the divided circuit including the anodes 15 and 16 and the cathode 14 are adapted to selectively energize the relay windings 17 and 18 associated therewith, and it is noted that when the cathode 14 is in a position intermediate the anodes 15 and 16 the said electric current flows will be substantially identical whereby the relay windings 17 and 18 will be energized to the same extent. On deflection of the cathode 14 from said intermediate position, however, the flow of current from one anode 15 or 16 to the cathode will increase and the flow of current from the other anodes to the cathode will decrease and may even assume a zero value, resulting in increased energization of one relay winding and deenergization of the other.

The relay winding 17 is operatively associated with a switch 24 which is biased by spring or other means in a clockwise direction out of engagement with a relatively fixed contact 25, and is adapted to be moved in a counter-clockwise direction into engagement with the contact 25 on energization of the said relay winding. The relay winding 18 is operatively associated with a switch arm 26 which is biased in a similar manner out of engagement with a fixed contact 27, and is adapted on energization of the relay winding 18 to be moved in a counter-clockwise direction into engagement with the contact 27. When the galvanometer pointer 8 is in its normal undeflected position and the cathode 14 is thereby intermediate the anodes 15 and 16, the relay windings 17 and 18 are both energized sufficiently to actuate their respective switch arms 24 and 26 into engagement with the contacts 25 and 27 associated with the arms 24 and 26, respectively. On deflection of the pointer 8 from its normal undeflected position, however, the energization of one relay winding 17 or 18 is decreased whereupon the contact arm 24 or 26 individual thereto is moved by the bias force acting on it out of engagement with its associated contact. The switch arms 26 and 24 which, as shown, are connected together, are connected by a conductor 28 to the supply conductor $L^2$, and the contacts 27 and 25 are connected to the terminals of a respective motor winding 13F and 13R. The remaining terminals of the windings 13F and 13R are connected by a common conductor 29 to the supply conductor L¹. With the described arrangement when one of the switch arms 24 or 26 is moved out of engagement with its respective contact, one winding 13F or 13R of the motor is connected directly to the supply lines L¹ and L² and the other is connected thereto through a condenser 30. In this case the energizing current for one of the windings lags that in the other whereby a rotating field is set up in the rotatable element of the motor which actuates the latter for rotation in one direction or the other depending upon which is lagging.

As illustrated, the shaft of motor 13 is connected in any convenient manner to a shaft 31 which may desirably be a rod having a spiral groove thereon and a potentiometer rebalancing contact 11 is mounted on a carriage carried by shaft 31, and is arranged to be moved in one direction or the other as shaft 31 rotates. Thus, when motor 13 is energized for rotation as a result of a change in the voltage developed by the thermocouple 2, the motor effects an adjusting movement of the contact 11 along the resistors 10 to rebalance the potentiometric network 5 and restore the galvanometer pointer 8 to its normal undeflected position and thereby to deenergize the motor 13 for rotation. The motor 13 will come to rest with the contact 11 at a new position along the slidewire resistors 10, which position will then provide a measure of the temperature to which the thermocouple 2 is exposed.

Desirably a pen 32 mounted on the carriage which carries a potentiometer rebalancing contact 11 is arranged to cooperate with a recorder chart 33 and thereby provide a continuous record of the temperature of the interior of furnace 1. The recorder chart is arranged to be driven in any convenient manner, as, for example, by a unidirectional electrical motor 34 through suitable gearing (not shown) so that a record of the temperature of the interior of furnace 1 will be had as a continuous line on the chart 33.

Figure 2:
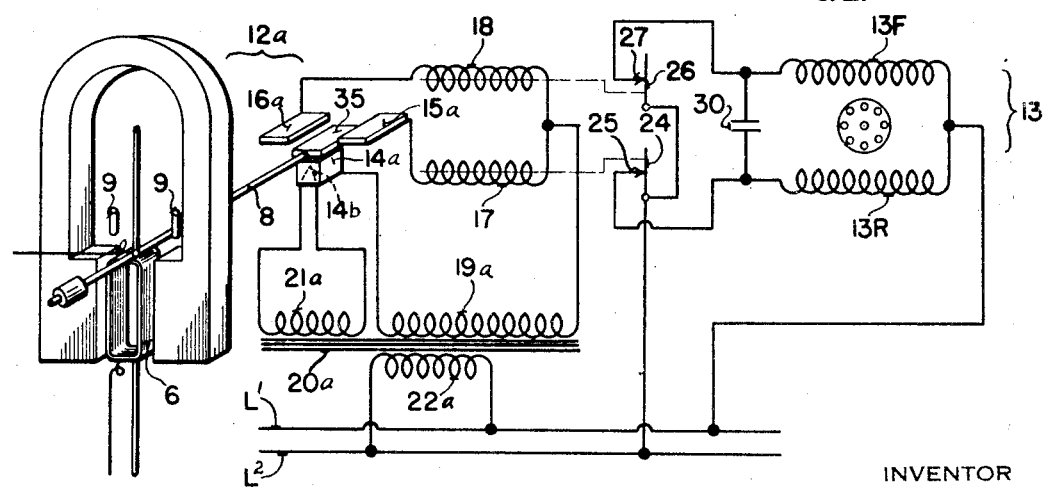

In Fig. 2 I have illustrated, more or less diagrammatically, a modification of the arrangement of Fig. 1 wherein an ionic discharge device 12a having a cathode 14a which is fixed relatively to a pair of spaced anodes 15a and 16a is employed in lieu of the ionic discharge device 12 of Fig. 1. As illustrated, the cathode 14a is positioned intermediate the anodes 15a and 16a but not in the same plane and is provided with a heating filament 14b which receives energizing current from the low voltage secondary winding 21a of a transformer 20a. The transformer 20a also includes a high voltage secondary winding 19a and a line voltage primary winding 22a havings its terminals connected to the alternating current supply conductors L¹ and L². The cathode 14a is connected to one terminal of the secondary winding 19a and the anodes 15a and 16a are each connected through a respective relay winding 17 and 18 to the remaining terminal of the winding.

In this arrangement the electric currents from each of the anodes 15a and 16a to the cathode 14a are controlled by means of a shield 35 carried on the end of the galvanometer pointer 8 and normally positioned intermediate the cathode 14a and the anodes 15a and 16a. In this position of the shield 35 the flow of current from each of the anodes to the cathode will be substantially identical and accordingly, neither relay winding 17 or 18 will be deenergized sufficiently to permit disengagement of the switch arms 24 or 26 with their respective contacts 25 and 27. On movement of the shield 35 from this position due to deflection of the galvanometer, however, the flow of current in one anode circuit will be decreased and that in the other anode circuit increased to thereby effect energization of the motor 13 for rotation in one direction or the other.

In Fig. 3 I have illustrated, more or less diagrammatically, another modification of the arrangement of Fig. 1 in which an ionic discharge device 36 to be described is employed in lieu of the ionic discharge device 12 and in which a reversible electrical motor 45 is continuously controlled as to rotation by electronic amplifying means under control of the ionic discharge device 36. As illustrated, the ionic discharge device 36 includes a pair of spaced anodes 37 and 38 and a cathode 39 positioned in the same plane as the anodes 37 and 38. The anodes 37 and 38 are connected to one terminal of a respective resistance 40 and 41 the remaining terminals of which are connected together and to the positive terminal of a suitable direct current voltage source indicated as a battery 42, and the cathode 39 is connected to the negative terminal of the battery. As will be readily apparent, a copper-oxide or other type of rectifier may be employed in lieu of the battery 42, if desired.

In this embodiment, the means provided for ionizing the atmosphere about the anodes 37 and 38 and the cathode 39 comprise a radio-active substance 43 carried on the end of the galvanometer pointer 8 and positioned adjacent the cathode 39 and intermediate the anodes 37 and 38 when the galvanometer pointer 8 is in its normal undeflected position. In this position of the radio-active substance 43 the space between the anode 37 and the cathode 39 is ionized to the same extent as that between the anode 38 and the cathode 39 whereby the electric current flows in each anode circuit will be identical. On deflection of the galvanometer pointer 8 in one direction or the other from that position, however, the radio-active substance 43 will ionize the atmosphere between one anode 37 or 38 and the cathode 39 to a greater extent than that between the other anode and the cathode, and as a result a greater current value will flow through one anode circuit than through the other.

It is noted the arrangement including the ionic discharge device 36 and the resistances 40 and 41 comprises a Wheatstone bridge network which is in a balanced condition when the radio-active substance 43 is intermediate the anodes 37 and 38, and is unbalanced on movement of the radio-active substance from that position. The unbalanced voltages produced in the Wheatstone bridge network are impressed on the input circuit of an electronic amplifier 44 wherein they are amplified and the amplified quantity is applied to the terminals of the motor 45 for selectively controlling the rotation and direction of rotation of the motor.

The amplifier 44 includes a pair of electronic tubes 46 and 47 shown as triodes having their cathodes connected through a common biasing resistance 48 to one terminal of the high voltage secondary winding 51 of a transformer 50, which terminal, as shown, is also connected to the positive terminal of the battery 42. As shown, the transformer 50 also includes a low voltage secondary winding 49 and a line voltage primary winding 52 connected to the supply conductors L¹ and L². The control electrode of the tube 46 is connected to the point of engagement of resistance 40 of the anode 37 and the control electrode of tube 47 is connected to the point of engagement of the resistance 41 of the anode 38.

The reversible electrical motor 45 is of the induction variety and includes a squirrel cage rotor 53 and two pairs of oppositely displaced field poles on which windings 54, 55 and 56 are wound. Winding 54 is wound on one pair of said field poles, and is connected to the alternating current supply conductors L¹ and L² through conductors 57 and 58 in the latter of which a condenser 59 is inserted so that the current which flows through this winding will lead the current of the supply conductors by approximately 90°. Windings 55 and 56 are wound on the other pair of field poles, one half of winding 55 being wound on a portion of one of the field poles which is adjacent the rotor 53, and the other half of which is wound on a portion of the other field pole remote from said rotor. Similarly, one half of winding 56 is wound on a portion of the last mentioned pole which is adjacent the rotor 53 and the other half of winding 56 is wound on a portion of the first mentioned pole remote from said rotor.

As illustrated, the anode circuits of the electron discharge devices 46 and 47 are connected in circuit with a respective motor winding 55 and 56, the biasing resistance 48, and the secondary winding 51 of the transformer 50. Windings 55 and 56 are so wound on motor 45 in respect to the manner in which winding 54 is wound thereon that when said windings 55 and 56 are equally energized the rotor 53 will not be actuated for rotation in either direction and will remain stationary, but when one winding is energized to a greater extent than the other the motor will be actuated for rotation in one direction or the other accordingly. That is to say, when the conductivity of the tube 46 is substantially identical to that of the tube 47 the torque developed by the winding 55 for producing rotation of the rotor 53 will be equal and opposite to the torque developed by the winding 56 and consequently the rotor 53 will remain stationary. When the relative conductivity of said tubes is varied, however, the torque developed by the winding 55 will vary with respect to the torque developed by the winding 56 and accordingly, the rotor 53 will be actuated for rotation in one direction or the other. A condenser 60 may desirably be connected between the anodes of tubes 46 and 47 for increasing the torque developed by motor 45.

When the Wheatstone bridge network including the ionic discharge device 36 is balanced, the control electrodes of the tubes 46 and 47 will be at the same potential and the conductivities of the said tubes, therefore, will be substantially identical. On deflection of the galvanometer pointer from its normal position, however, the resulting unbalance of the Wheatstone bridge network will vary the conductivity of one tube 46 or 47 with respect to that of the other to thereby effect energization of motor 45 for rotation in a corresponding direction.

In Fig. 4 I have illustrated, more or less diagrammatically, a modification of the ionization discharge device of Fig. 3 wherein the galvanometer coil 6 and the pointer 8 carried thereby are positioned within an envelope 36a the interior of which may be maintained at atmospheric or any other suitable pressure. As illustrated in Fig. 4, a radio-active substance 43 is carried on the end of the galvanometer pointer 8 and is adapted to move between a pair of electrodes 37a and 38a which may be connected to the resistances 40 and 41 of Fig. 3 in lieu of the connection of the electrodes 37 and 38 thereto. In this embodiment of my invention the radio-active substance 43 is electrically connected to the negative terminal of the battery 42 of Fig. 3 in lieu of the connection of the electrode 39 thereto, and hence is employed as a cathode in addition to producing ionization of the atmosphere surrounding the anodes 37a and 38a.

A practical advantage of this form of my invention resides in the elimination of undesirable effects due to the presence of air currents or other physically disturbing effects in the vicinity of the ionization discharge device. A further advantage of this arrangement is that the gas within the enclosure 36a and the pressure thereof may be so chosen as to produce the most efficient operation of the apparatus. It will be apparent that the galvanometer coil 6 and pointer 8 of Figs. 1–3 may also be positioned within an enclosure 36a as illustrated in Fig. 4 if desired.

In a practical embodiment of the apparatus forms disclosed in Figs. 3 and 4 it is desirable to shield the ionization discharge device to prevent the radio-active radiations from the substance 43 from penetrating into the region in which the apparatus is located. To this end the galvanometer 7 and the ionization discharge devices 43 of Figs. 3 and 4 may be mounted in a lead casing of suitable wall thickness. If desired, the shielding effect may be obtained in the apparatus form of Fig. 4 by simply forming the enclosure 36a of lead glass.

In Fig. 5 I have illustrated, more or less diagrammatically, a modification of the arrangement of Fig. 3 wherein an ionic discharge device 61 to be described is employed in lieu of the ionic discharge device 36 of Fig. 3 and a simplified form of amplifier is employed for controlling the rotation and direction of rotation of a reversible electrical motor 45. The ionic discharge device 61 includes a pair of spaced metallic plates 62 and 63, between which a fixed contact 64 and the deflecting pointer 8 of the galvanometer 7 are positioned in the path of the discharge current passing between the anodes. The region between the plates 62 and 63 is ionized by a substance 65 which may desirably be radio-active in nature to permit the passage of said discharge current.

The elements 62 and 63 are connected to the opposite terminals of the high voltage secondary winding 66 of a transformer 67 having a low voltage secondary winding 69 and a line voltage primary winding 68 connected to the supply conductors L¹ and L². As illustrated, the contact 64 is positioned intermediate the elements 62 and 63 and since the said contact is fixed in position, the potential of the latter will remain fixed relative to the potential of the pointer 8 which latter potential will be varied in accordance with the deflections of the galvanometer coil 6 from its normal position. The pointer 8 and contact 64 are connected to the opposite terminals of the primary winding 70 of a transformer 71 having a secondary winding connected to the input side of an electronic tube 73.

When the galvanometer pointer 8 is intermediate the elements 63 and 64 and closely adjacent the contact 65 the potential of the latter and the pointer 8 will be substantially identical whereby the voltage impressed on the input circuit of the tube 73 will be zero. On deflection of the pointer 8 from that intermediate position, however, the potential of the said pointer will be varied with respect to the potential of the contact 64, and accordingly, an alternating voltage in phase with the voltage of the supply conductors or 180° out of phase therewith, will be impressed on the transformer primary winding 70. This voltage is impressed on the input circuit of the electron discharge tube 73 wherein it is amplified and the amplified quantity is applied to the motor 45 for selectively controlling the rotation thereof. As illustrated, the electron tube 73 is a heater type triode the filament of which receives energizing current from the secondary winding 69 of transformer 67 and the control grid of which is connected to the cathode through a circuit which may be traced from the control grid to the transformer secondary winding 72 and through a biasing resistance 74 shunted by a condenser 75 to the cathode.

Motor 45 is of the induction variety and may be identical to the correspondingly identified part of Fig. 3. In this modification, however, winding 55 is connected to the alternating current supply source through a fixed resistance 76 and the winding 56 is connected to the supply source in series circuit relation with the tube 73. When the effective conductivity of the tube 73 is identical with that of resistance 76, the currents flowing through the winidngs 55 and 56 will be of substantially the same magnitude and phase and accordingly the motor will not be actuated for rotation. As the conductivity of the tube 73 is varied by the voltage impressed thereon by the transformer secondary winding 72, the impedance of the circuit path including the motor winding 56 will vary with respect to that of the motor winding 55 with the result that a difference in potential will exist across the terminals of condenser 60. In effect the latter will then be connected in series circuit relation with one motor winding and this arrangement in parallel with the other motor winding so that the current flow from the first mentioned winding will lead the current flow from the other motor winding and thereby produce energization of the motor for rotation in one direction or the other. This arrangement for selecitvely controlling an electrical motor for reversible operation is disclosed and is being claimed in a copending application Serial No. 159,198, filed August 14, 1937 by Thomas R. Harrison.

Thus, on deflection of the galvanometer pointer 8 in one direction or the other from its normal position, an alternating voltage is impressed on the input circuit of tube 73 which is effective to change the conductivity of the said tube as required to cause rotation of motor 45 in the proper direction to restore the potentiometric network 5 to its balance condition and thereby reduce the deflection of the galvanometer pointer 8.

It will be apparent the motor 13 of Figs. 1 and 2 or the motor 45 of Figs. 3 and 4, respectively, may be employed to operate a control valve or rheostat for governing the application of an agent to a furnace for producing heat, for example, to which the thermocouple 2 is responsive, or another motor desirably operated together with either of the said motors may be so employed. For example, as shown in Fig. 6, the furnace 1 to the temperature of which the thermocouple 2 is responsive is heated by a resistance 77 which is connected to electrical supply conductors L³ and L⁴ through a rheostat 78, the adjustment of which is effected by a motor 79. The motor 79 may be exactly like motor 13 of Fig. 1, and is shown connected in parallel therewith. The mechanical connection of the rheostat 78 to the motor 79 is such as to decrease and increase the supply of electric current to resistance 77 as the temperature of the furnace rises above or falls below a predetermined level.

While in accordance with the provisions of the statutes, I have illustrated and described the best form of my invention now known to me, it will be apparent to those skilled in the art, that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Apparatus comprising a galvanometer having a movable coil, an ionization discharge device having a plurality of electrodes subjected to atmospheric pressure, means to ionize the atmosphere surrounding said electrodes, means to apply a voltage between said electrodes to produce a discharge of electric current therebetween, and means moved relatively to at least one of said electrodes by said galvanometer coil to gradually vary the passage of electric current between said electrodes in accordance with the movements of said galvanometer coil.

2. Apparatus comprising a galvanometer having a movable coil, an ionization discharge device having an anode and a cathode which are subjected to atmospheric pressure, means to ionize the atmosphere between said anode and cathode, means to apply a voltage between said anode and cathode to produce a discharge of electric current therebetween, and means under control of said galvanometer coil to relatively move said anode and cathode to gradually vary the passage of electric current between said anode and cathode.

3. Apparatus comprising a galvanometer having a movable coil, an ionization discharge device having a pair of spaced anodes and a cathode which are subjected to atmospheric pressure, said cathode being adapted to be moved relatively to said anodes in accordance with the movements of the movable coil of said galvanometer, radio-active means to ionize the atmosphere surrounding said anodes and cathode, and means to apply a voltage between said anodes and cathode to produce a discharge of electric current between said anodes and said cathode.

4. Apparatus comprising a galvanometer having a movable coil and a pointer rigid with said coil, an ionization discharge device having a cathode carried by the pointer of said galvanometer and a relatively fixed anode disposed in cooperative relation with said cathode, said anode and cathode being subjected to atmospheric pressure, radio-active means to ionize the atmosphere surrounding said anode and cathode, and means to apply a voltage between said anode and cathode to produce a discharge of electric current therebetween.

5. Apparatus comprising a galvanometer having a movable coil and a pointer rigid with said coil, an ionization discharge device having a cathode carried by the pointer of said galvanometer and a pair of relatively fixed anodes disposed in cooperative relation with said cathode, said anodes and cathode being subjected to atmospheric pressure, radio-active means to ionize the atmosphere surrounding said anodes and cathode, and means to apply a voltage between said anodes and cathode to produce a discharge of electric current therebetween.

6. Apparatus comprising a galvanometer having a movable coil and a pointer rigid with said coil, an ionization discharge device having a plurality of electrodes, radio-active means carried by said galvanometer pointer to ionize the atmosphere surrounding said electrodes, and means to apply a voltage between said electrodes to produce a discharge of electric current therebetween.

7. Apparatus comprising a galvanometer having a movable coil, an ionization discharge device having a plurality of electrodes which are subjected to atmospheric pressure, radio-active means carried by the movable coil of said galvanometer to ionize the atmosphere surrounding said electrodes, and means to apply a voltage between said electrodes to produce a discharge of electric current therebetween.

8. Apparatus comprising a galvanometer having a movable coil, an ionization discharge device having at least three electrodes disposed end to end in substantially the same plane, said electrodes being subjected to atmospheric pressure, radio-active means carried by the movable coil of said galvanometer and disposed in cooperative relation with said electrodes to ionize the atmosphere surrounding said electrodes, and means to apply a voltage between the two end electrodes and the intermediate electrode to produce a discharge of electric current between said end and intermediate electrodes, the relative magnitudes of the discharge current from said end electrodes to said intermediate electrode varying in accordance with the position of said radio-active means relatively to said electrodes.

9. In a normally balanced electrical network adapted to be unbalanced in accordance with variations in a variable condition to be measured and adapted to be rebalanced on unbalance thereof rebalancing means, the combination with said rebalancing means of means responsive to unbalance of said network, an ionization discharge device having a plurality of electrodes subjected to atmospheric pressure, means to ionize the atmosphere surrounding said electrodes, means moved relatively to at least one of said electrodes by said last mentioned means to gradually vary the potential of one of said electrodes relatively to another of said electrodes in accordance with the variations in said condition, and means connected to said electrodes to control the actuation of said rebalancing means.

10. In a normally balanced electrical network adapted to be unbalanced in accordance with variations in a variable condition to be measured and adapted to be rebalanced on unbalance thereof by rebalancing means, the combination with said rebalancing means of a galvanometer having a movable coil connected to said network, which movable coil deflects in one direction or the other from a predetermined position in accordance with the direction of unbalance of said network, an ionization discharge device having a plurality of electrodes subjected to atmospheric pressure, means to ionize the atmosphere surrounding said electrodes, means to apply a voltage between said electrodes to produce a discharge of electric current therebetween, means moved relatively to at least one of said electrodes by said galvanometer coil to gradually vary the amount of electric current passed between said electrodes in accordance with the movements of said galvanometer coil, and means under control of said electric current to control the actuation of said rebalancing means.

11. In a normally balanced electrical network adapted to be unbalanced in accordance with variations in a variable condition to be measured and adapted to be rebalanced on unbalance thereof by rebalancing means, the combination with said rebalancing means of a galvanometer having a movable coil connected to said network, which movable coil deflects in one direction or the other from a predetermined position in accordance with the direction of unbalance of said network, an ionization discharge device having a pair of spaced anodes and a cathode which are subjected to atmospheric pressure, means to ionize the atmosphere surrounding said anodes and cathode, means to apply a voltage between said anodes and cathode to produce a discharge of electric current therebetween, means moved relatively to said ionization discharge device by said galvanometer coil to gradually vary the relative magnitudes of the current flows between said anodes and cathode in accordance with the movements of said galvanometer coil, and means selectively actuated in response to differences in the magnitudes of said current flows to control the actuation of said rebalancing means.

12. In a normally balanced electrical network adapted to be unbalanced in accordance with variations in a variable condition to be measured and adapted to be rebalanced on unbalance thereof by rebalancing means, the combination with said rebalancing means of a galvanometer having a movable coil connected to said network, which movable coil deflects in one direction or the other from a predetermined position in accordance with the direction of unbalance of said network, an ionization discharge device having a pair of spaced anodes and a cathode which are subjected to atmospheric pressure, radio-active means to ionize the atmosphere surrounding said anodes and cathode, means to apply a voltage between said anodes and cathode to produce a discharge of electric current therebetween, means moved relatively to said ionization discharge device by said galvanometer coil to gradually vary the relative magnitudes of the current flows between said anodes and cathode in accordance with the movements of said galvanometer coil, and means selectively actuated in response to differences in the magnitudes of said current flows to control the actuation of said rebalancing means.

13. In a normally balanced electrical network adapted to be unbalanced in accordance with variations in a variable condition to be measured and adapted to be rebalanced on unbalance thereof by rebalancing means, the combination with said rebalancing means of a galvanometer having a movable coil connected to said network and a pointer rigid with said coil, which movable coil and pointer deflect in one direction or the other from a predetermined position in accordance with the direction of unbalance of said network, an ionization discharge device having a plurality of electrodes, radio-active means carried by said galvanometer pointer to ionize the atmosphere surrounding said electrodes, means to apply a voltage between said electrodes to produce a discharge of electric current therebetween, and means selectively actuated in accordance with a characteristic of the current passing between said electrodes to control the actuation of said rebalancing means.

14. In a normally balanced electrical network adapted to be unbalanced in accordance with variations in a varable condition to be measured and adapted to be rebalanced on unbalance thereof by rebalancing means, the combination with said rebalancing means of an ionization discharge device having a pair of spaced anodes and a cathode which are subjected to atmospheric pressure, a bridge network one arm of which includes the space path resistance between one of said anodes and cathode and an opposed arm of which includes the space path resistance between the other of said anodes and said cathode, means to ionize the atmosphere surrounding said anodes and cathode, a galvanometer connected to said normally balanced electrical network and responsive to the state of balance thereof to control said last mentioned means to unbalance said bridge network, and relay means responsive to bridge network unbalance to control the actuation of said rebalancing means.

15. In a normally balanced electrical network adapted to be unbalanced in accordance with variations in a variable condition to be measured and adapted to be rebalanced on unbalance thereof by rebalancing means, the combination with said rebalancing means of an ionization discharge device having a pair of spaced anodes and a cathode which are subjected to atmospheric pressure, a bridge network one arm of which includes the space path resistance between one of said anodes and cathode and an opposed arm of which includes the space path resistance between the other of said anodes and said cathode, radio-active means to ionize the atmosphere surrounding said anodes and cathode, a deflectable galvanometer connected to said normally balanced electrical network and responsive to the state of balance thereof to control the ionizing effect of said last mentioned means on said space path resistances according to the deflection thereof to unbalance said bridge network, and relay means responsive to bridge network unbalance to control the actuation of said rebalancing means.

EARL A. KEELER.